United States Patent
Mistry et al.

(10) Patent No.: US 10,356,169 B1
(45) Date of Patent: Jul. 16, 2019

(54) VIRTUAL CONTENT DELIVERY NETWORK

(71) Applicant: EMC Corporation, Hopkinton, MA (US)

(72) Inventors: Nalinkumar Mistry, Ottawa (CA); Donagh Buckley, Co. Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 782 days.

(21) Appl. No.: 14/580,304

(22) Filed: Dec. 23, 2014

(51) Int. Cl.
*G06F 15/16* (2006.01)
*H04L 29/08* (2006.01)

(52) U.S. Cl.
CPC .......... *H04L 67/1095* (2013.01); *H04L 67/06* (2013.01)

(58) Field of Classification Search
CPC ...................................................... H04L 67/06
See application file for complete search history.

(56) References Cited

U.S. PATENT DOCUMENTS

| | | | |
|---|---|---|---|
| 6,459,682 B1 | 10/2002 | Ellesson et al. | |
| 6,556,659 B1 | 4/2003 | Bowman-Amuah | |
| 7,054,943 B1 | 5/2006 | Goldszmidt et al. | |
| 7,269,157 B2 | 9/2007 | Klinker et al. | |
| 7,356,602 B2 | 4/2008 | Goldszmidt et al. | |
| 7,653,730 B1 | 1/2010 | Hoffman et al. | |
| 7,937,453 B1 | 5/2011 | Hayden et al. | |
| 8,190,850 B1 | 5/2012 | Davenport et al. | |
| 8,291,411 B2 | 10/2012 | Beaty et al. | |
| 8,452,928 B1 | 5/2013 | Ofer et al. | |
| 2002/0083118 A1 | 6/2002 | Sim | |
| 2002/0133491 A1 | 9/2002 | Sim et al. | |
| 2003/0117954 A1 | 6/2003 | De Neve et al. | |
| 2012/0076052 A1 | 3/2012 | Kling et al. | |
| 2014/0101665 A1 | 4/2014 | Mousseau et al. | |

(Continued)

OTHER PUBLICATIONS

European Telecommunications Standards Institute (ETSI), "Network Functions Virtualisation (NFV); Use Cases," ETSI GS NFV 001, V1.1.1, Oct. 2013, 50 pages.

(Continued)

*Primary Examiner* — Dustin Nguyen
*Assistant Examiner* — Joel Mesa
(74) *Attorney, Agent, or Firm* — Ryan, Mason & Lewis, LLP

(57) ABSTRACT

A plurality of virtual content delivery network nodes are implemented using virtualization infrastructure of at least one processing platform. The processing platform is implemented using at least one processing device comprising a processor coupled to a memory. Each of the virtual content delivery network nodes comprises one or more virtual network function instances of a network functions virtualization framework of the virtualization infrastructure. The virtual content delivery network nodes may be dynamically added to, modified in and deleted from at least one virtual content delivery network in accordance with one or more specified policy criteria. A virtual content delivery network control plane may be arranged as an overlay relative to the network functions virtualization framework of the virtualization infrastructure. The virtual content delivery network control plane communicates with the network functions virtualization framework via one or more application programming interfaces.

19 Claims, 8 Drawing Sheets

(56) References Cited

U.S. PATENT DOCUMENTS

| | | | |
|---|---|---|---|
| 2014/0201374 A1 | 7/2014 | Ashwood-Smith et al. | |
| 2014/0241247 A1 | 8/2014 | Kempf et al. | |
| 2014/0298337 A1 | 10/2014 | Anderson et al. | |
| 2014/0301192 A1 | 10/2014 | Lee et al. | |
| 2014/0317261 A1 | 10/2014 | Shatzkamer et al. | |
| 2015/0089022 A1* | 3/2015 | Husain | H04L 67/1095 709/219 |
| 2015/0134606 A1* | 5/2015 | Magdon-Ismail | G06F 16/27 707/610 |
| 2016/0004565 A1* | 1/2016 | Harper | G06F 9/4881 718/102 |
| 2017/0324828 A1* | 11/2017 | Clavera | H04L 67/2842 |

OTHER PUBLICATIONS

European Telecommunications Standards Institute, "Network Functions Virtualisation," Introductory White Paper, presented at the SDN and OpenFlow World Congress, http://portal.etsi.org/NFV/NFV_White_Paper.pdf, Oct. 22-24, 2012, pp. 1-16, Issue 1, Darmstadt, Germany.

European Telecommunications Standards Institute, "Network Functions Virtualisation (NFV)," Update White Paper, presented at the SDN and OpenFlow World Congress, http://portal.etsi.org/NFV/NFV_White_Paper2.pdf, Oct. 15-17, 2013, pp. 1-16, Issue 1, Frankfurt, Germany.

A. Keller et al., "The WSLA Framework: Specifying and Monitoring Service Level Agreements for Web Services," Journal of Network and Systems Management, Mar. 2003, pp. 57-81, vol. 11, No. 1.

M. Mangili et al., "Stochastic Planning for Content Delivery: Unveiling the Benefits of Network Functions Virtualization," The 22nd IEEE International Conference on Network Protocols (ICNP), Oct. 2014, 6 pages.

M.K. Nichat et al., "Review on Modeling and Implementation of Cloud Computing," International Journal of Computer Science and Information Technologies (IJCSIT), Jan.-Feb. 2014, pp. 508-511, vol. 5, No. 1.

S. Aleksic et al., "Network Virtualization: Paving the Way to Carrier Clouds (invited)," 16th International Telecommunications Network Strategy and Planning Symposium (Networks), Sep. 2014, pp. 1-6, Funchal, Madeira Island, Portugal.

M. Chiosi et al., "Network Functions Virtualisation—An Introduction, Benefits, Enablers, Challenges & Call for Action," Introductory White Paper, SDN and OpenFlow World Congress, Oct. 2012, pp. 1-16, No. 1, Darmstadt, Germany.

Wikipedia, "Network Functions Virtualization," http://en.wikipedia.org/wiki/Network_Functions_Virtualization, Nov. 2014, 4 pages.

R. Jain, "OpenFlow, Software Defined Networking (SDN) and Network Function Virtualization (NFV)," Washington University in St. Louis, http://www.cse.wustl.edu/~jain/tutorials/icc14.htm, 2014, 93 pages.

U.S. Appl. No. 14/042,180 filed in the name of Buckley et al. and entitled "System and Method for Partitioning a Network."

* cited by examiner

VIRTUAL CONTENT DELIVERY NETWORK

FIELD

The field relates generally to information processing systems, and more particularly to content delivery in information processing systems comprising virtualization infrastructure.

BACKGROUND

Information processing systems increasingly utilize reconfigurable virtual resources to meet changing end user needs in an efficient, flexible and cost-effective manner. For example, cloud computing and storage systems implemented using virtual resources have been widely adopted. More recently, network functions virtualization techniques have been proposed for use by telecommunication system and cable system service providers. Conventional aspects of such techniques are disclosed in European Telecommunications Standards Institute (ETSI), ETSI GS NFV 001, V1.1.1, "Network Functions Virtualisation (NFV): Use Cases," October 2013, which is incorporated by reference herein. See also the Introductory and Updated White Papers entitled "Network Functions Virtualisation," presented at the SDN and OpenFlow World Congress, Oct. 22-24, 2012 and Oct. 15-17, 2013, respectively, which are incorporated by reference herein. However, despite these and other recent advances in virtualization techniques, a need remains for further improvements, for example, with regard to implementation of content delivery functionality.

SUMMARY

Illustrative embodiments of the present invention provide a virtual content delivery network comprising multiple virtual content delivery network nodes configured to considerably facilitate the delivery of content in network-based information processing systems comprising virtualization infrastructure.

In one embodiment, a plurality of virtual content delivery network nodes are implemented using virtualization infrastructure of at least one processing platform. The processing platform is implemented using at least one processing device comprising a processor coupled to a memory. Each of the virtual content delivery network nodes comprises one or more virtual network function instances of a network functions virtualization framework of the virtualization infrastructure.

The virtual content delivery network nodes may be dynamically added to, modified in and deleted from at least one virtual content delivery network in accordance with one or more specified policy criteria.

A virtual content delivery network control plane may be arranged as an overlay relative to the network functions virtualization framework of the virtualization infrastructure. The virtual content delivery network control plane communicates with the network functions virtualization framework via one or more application programming interfaces.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Examples of information processing systems in which virtual content delivery networks (vCDNs) are implemented in illustrative embodiments will initially be described with reference to FIGS. 1A and 1B. It should be noted that these particular examples are shown as high-level reference architectures that utilize vCDNs in designated configurations, although numerous alternative configurations can be used, and vCDNs can also be dynamically reconfigured responsive to customer demand and other factors. Additional details regarding possible features and functionality of vCDNs in these and other embodiments will be described in more detail below with reference to FIGS. 2 through 6.

Figure 1A:
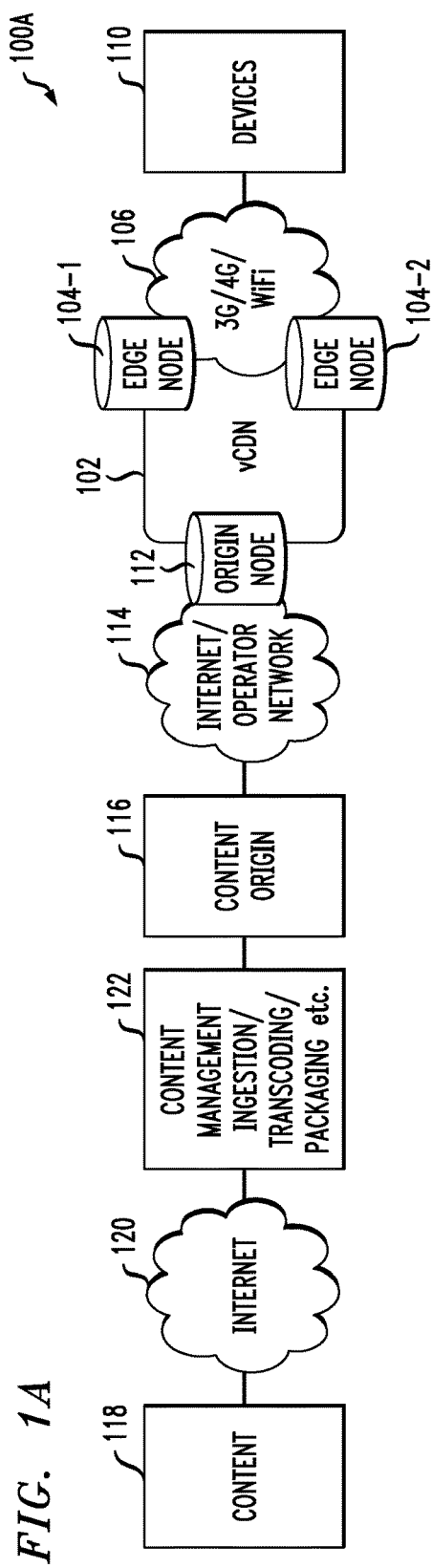
FIGS. 1A and 1B are block diagrams of respective information processing systems in which virtual content delivery networks are implemented in illustrative embodiments. These figures are collectively referred to herein as FIG. 1.

Referring now to FIG. 1A, an information processing system 100A comprises a vCDN 102. The vCDN 102 comprises edge nodes 104-1 and 104-2. These edge nodes 104 communicate over a first network 106 with devices 110 of system customers. The first network is illustratively a wireless network such as a 3G or 4G cellular network or a WiFi network. The vCDN 102 further comprises an additional node 112 referred to as an origin node, and may comprise numerous other nodes not expressly illustrated in this simplified diagram. Such other nodes illustratively comprise core nodes that are located away from the edges of the vCDN 102. The origin node 112 is considered a special type of edge node.

The edge nodes 104 and origin node 112 may be more particularly implemented as respective edge and origin servers. These nodes may be viewed as examples of what are more generally referred to herein as vCDN nodes. The origin node 112 communicates over a second network 114 with a content origin entity 116 that provides processed versions of content 118 for delivery over the vCDN 102 to the devices 110. The network 114 illustratively comprises the Internet or an operator network.

The content 118 in this embodiment is supplied over a third network 120 to a content management module 122 which performs operations such as ingestion, transcoding and packaging on the content before the content is provided to the content origin entity 116 from which it can be provided to the origin node 112 for delivery over the vCDN 102. The third network 120 also illustratively comprises the Internet, although it should be appreciated that the first, second and third networks 106, 114 and 120 in this embodiment could comprise other types of networks, or possibly different portions of a single network.

Although shown as separate from the first, second and third networks in this embodiment, the vCDN 102 is illustratively implemented in a distributed manner utilizing virtualization infrastructure that comprises compute, storage and network resources associated with one or more of these networks, such as networks 106 and 114.

The system 100A of FIG. 1A can be illustratively configured as a video-on-demand (VOD) system that delivers video content in the form of selected multimedia files to the devices 110 over the vCDN 102. Numerous other types of content can be delivered over a vCDN as disclosed herein, including web content, audio content, document files and many others. Accordingly, terms such as "content" and "content delivery" are therefore intended to be broadly construed.

When an end user requests access to a particular multimedia file or other available content item, the content item is typically served from the edge node of the vCDN that is nearest to the end user, assuming that edge node has the content cached. If the edge node does not have the requested content item cached, the content item is requested from an upstream node, such as one or more of the above-noted core or origin nodes of the vCDN.

The term "end user" in this embodiment may refer, for example, to respective ones of the devices 110 or their corresponding human users, although the term "end user" as utilized herein is intended to be broadly construed so as to encompass numerous other arrangements of human, hardware, software or firmware entities, as well as combinations of such entities.

Figure 1B:
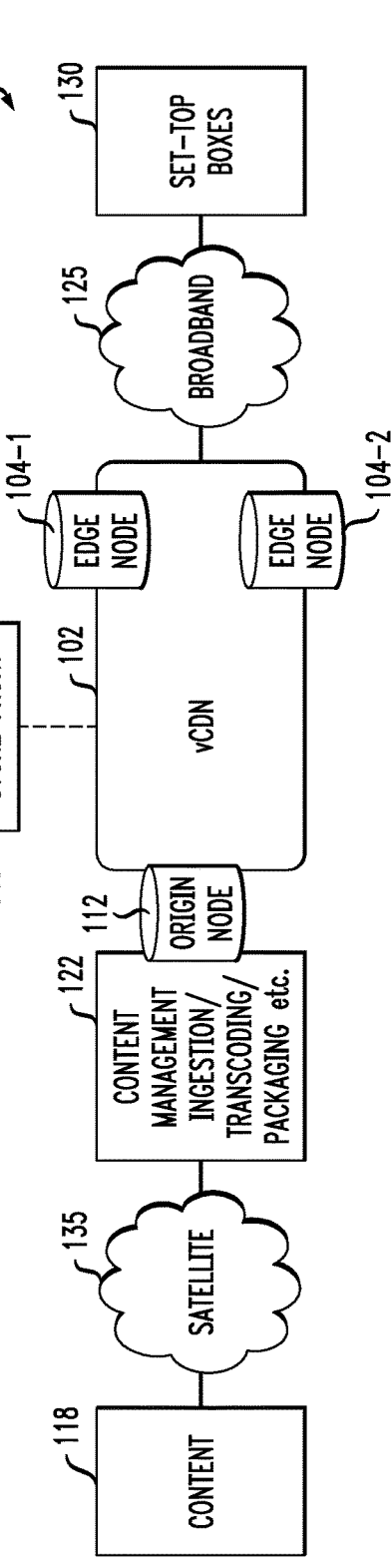

FIG. 1B shows an alternative configuration of an information processing system 100B comprising the vCDN 102 and its associated edge nodes 104-1 and 104-2 and origin node 112. This configuration also comprises content management module 122, but the module 122 in FIG. 1B is coupled directly to the origin node 112. The second network 114 and content origin entity 116 of FIG. 1A are therefore eliminated. The content is delivered from the vCDN 102 over a broadband network 125 to set-top boxes 130. In addition, the content 118 is provided to module 122 via a satellite network 135. This system 100B is illustratively configured as a VOD system that delivers video content in the form of selected multimedia files to the set-top boxes 130 over the vCDN 102. The vCDN 102 is also associated with a store front 140 as shown in the figure.

Although shown as separate from the networks 125 and 135, the vCDN 102 in this embodiment is also assumed to be illustratively implemented in a distributed manner utilizing virtualization infrastructure that comprises compute, storage and network resources associated with one or more of these networks.

Again, the particular configurations of systems 100A and 100B are presented by way of example only, and should not be construed as limiting in any way. Numerous other arrangements of networks, vCDNs and associated vCDN nodes can be used in implementing embodiments of the invention.

Figure 8:
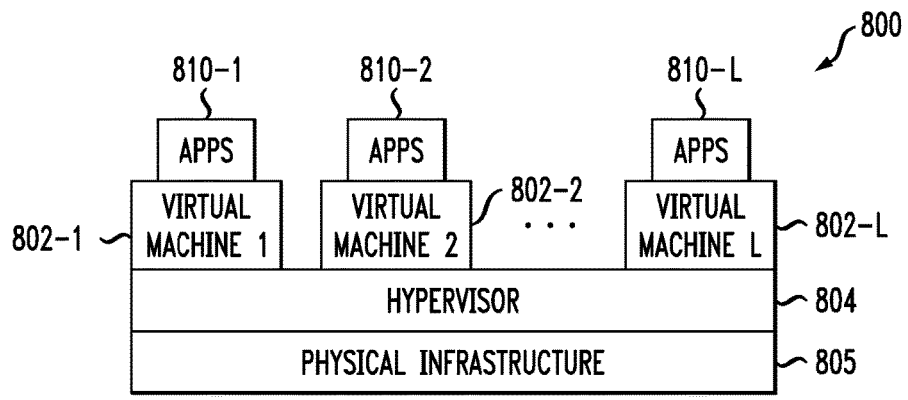
FIGS. 8 and 9 show examples of processing platforms that may be utilized to implement at least a portion of a virtual content delivery network in an information processing system.
Figure 9:
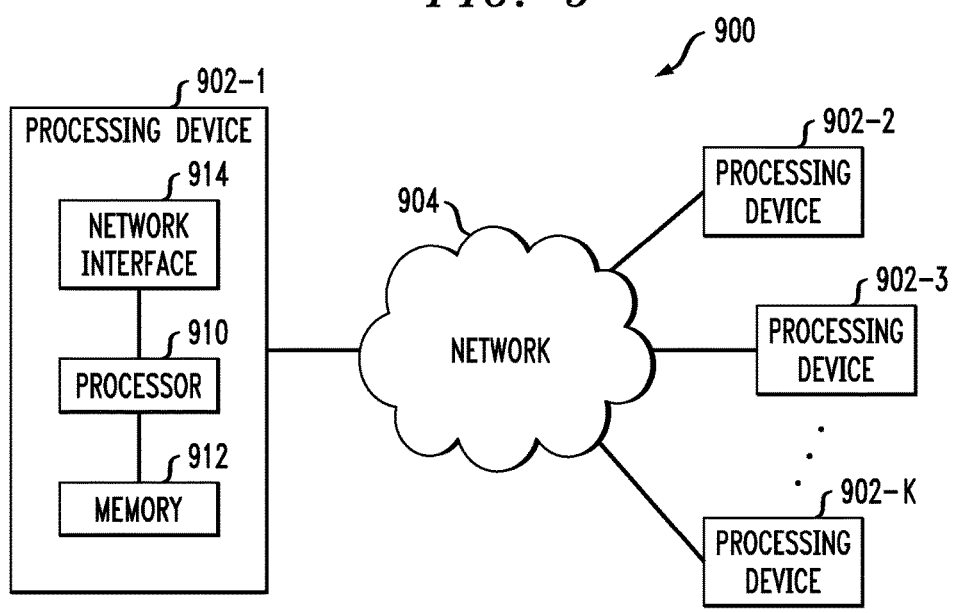

In a given vCDN such as vCDN 102 in FIGS. 1A and 1B, the vCDN illustratively comprises a plurality of vCDN nodes implemented utilizing virtualization infrastructure. As will be described in more detail below, such virtualization infrastructure in some embodiments is implemented using at least one processing platform, examples of which are shown in FIGS. 8 and 9. Moreover, each of the vCDN nodes comprises one or more virtual network function (VNF) instances of a network functions virtualization (NFV) framework of the virtualization infrastructure.

In such an arrangement, the vCDN nodes can be dynamically added to, modified in and deleted from at least one vCDN in accordance with one or more specified policy criteria. As noted above, the vCDN nodes can illustratively comprise respective ones of edge and core nodes of the vCDN.

Also, in some embodiments, the vCDN nodes are hierarchically distributed to facilitate scaling of at least one vCDN. More particularly, scale out and scale up mechanisms can be provided using hierarchically-distributed vCDN edge nodes.

The vCDN nodes in some embodiments are implemented as respective virtual appliances that can be reconfigured to support different vCDNs or to perform different functions within a given vCDN. Such appliances can be configured to include variable amounts of storage and compute resources as dynamically allocated from the virtualization infrastructure of the system responsive to end user demand, location and other factors. By way of example, VNF instances can be used in some embodiments to support one or more vCDN edge or core nodes as respective vCDN appliances.

Additional illustrative embodiments of vCDNs will now be described with reference to FIGS. 2 through 6.

Figure 2:
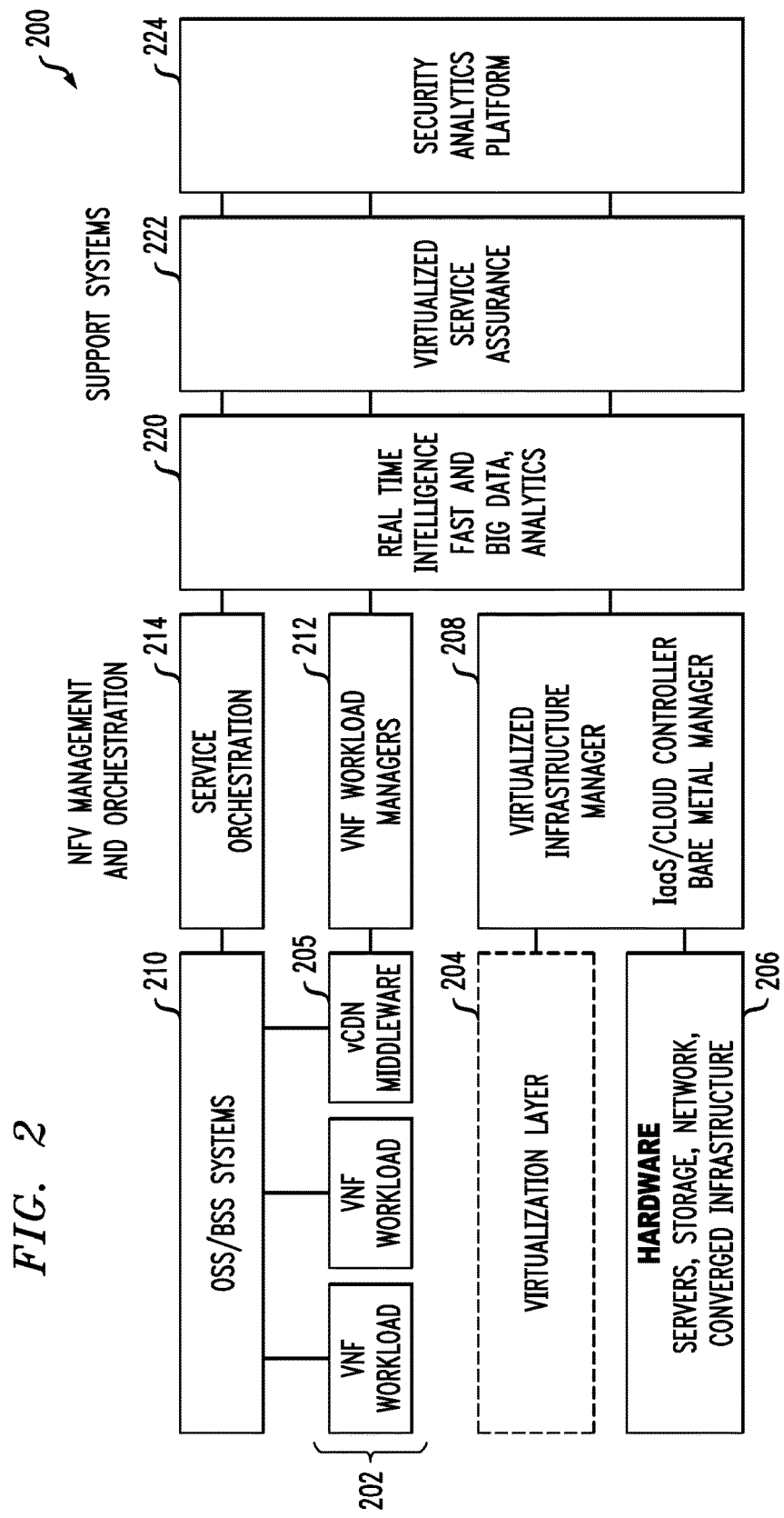
FIG. 2 is a block diagram of another embodiment of an information processing system comprising a virtual content delivery network.

Referring now to FIG. 2, an information processing system 200 in one embodiment comprises a plurality of VNF workloads 202. The VNF workloads 202 are examples of what are more generally referred to herein as "VNF instances" of an NFV framework, although other types of VNF instances can be used in other embodiments. The VNF workloads 202 are associated with a virtualization layer 204 of the system 200.

A given one of the VNF instances is specifically configured to provide vCDN middleware 205 for use in implementing one or more vCDN nodes of at least one vCDN. The virtualization layer 204 runs on underlying hardware 206 which illustratively comprises servers, storage, network and converged infrastructure resources, under the control of a virtualized infrastructure manager 208. The virtualized infrastructure manager 208 in this embodiment comprises an infrastructure-as-a-service (IaaS) manager, a cloud controller and a so-called "bare metal" manager, where "bare metal" refers to physical infrastructure elements that do not include an operating system, and may include at least a portion of the physical infrastructure elements provided in this embodiment by hardware 206.

The VNF workloads 202, virtualization layer 204, hardware 206 and virtualized infrastructure manager 208 may be collectively viewed as one example of what is more generally referred to herein as "virtualization infrastructure." Other types of virtualization infrastructure can be used in other embodiments, including the example processing platform of FIG. 8. The VNF workloads 202 in this embodiment are assumed to comprise respective applications running inside containers of the virtualization infrastructure or on one or more virtual machines of the virtualization infrastructure.

The VNF workloads 202, including the vCDN middleware 205, are controlled at least in part by support systems 210 which comprise an operations support system (OSS) and a business support system (BSS). Additional control functionality for the VNF workloads 202 is provided by VNF workload managers 212, service orchestration module 214.

The VNF workload managers 212 and service orchestration module 214 collectively comprise one example of what is more generally referred to herein as an NFV management entity, although in this particular embodiment more specifically denoted in the figure as an NFV management and orchestration entity.

In the FIG. 2 embodiment, the CND middleware 205 running as one of the VNF workloads 202 is used to implement one or more vCDN nodes of a vCDN. Such a vCDN can be more particularly implemented, for example, utilizing one or more virtual machines of the virtualization infrastructure under the control of the NFV management and orchestration entity. That entity can illustratively support add, modify and delete operations relating to the one or more virtual machines utilized to implement the given vCDN node.

Additional support systems associated with virtualized infrastructure manager 208, VNF workload managers 212 and service orchestration module 214 in the information processing system 200 include an analytics module 220 providing real time intelligence for "fast data" and "big data" analytics, a virtualized service assurance module 222, and a security analytics platform 224.

It is to be appreciated that the particular arrangement of modules and other components of the system 200 and other information processing systems described herein is illustrative only, and should not be construed as limiting in any way. Numerous alternative arrangements of modules and other components can be used in other embodiments.

Figure 3:
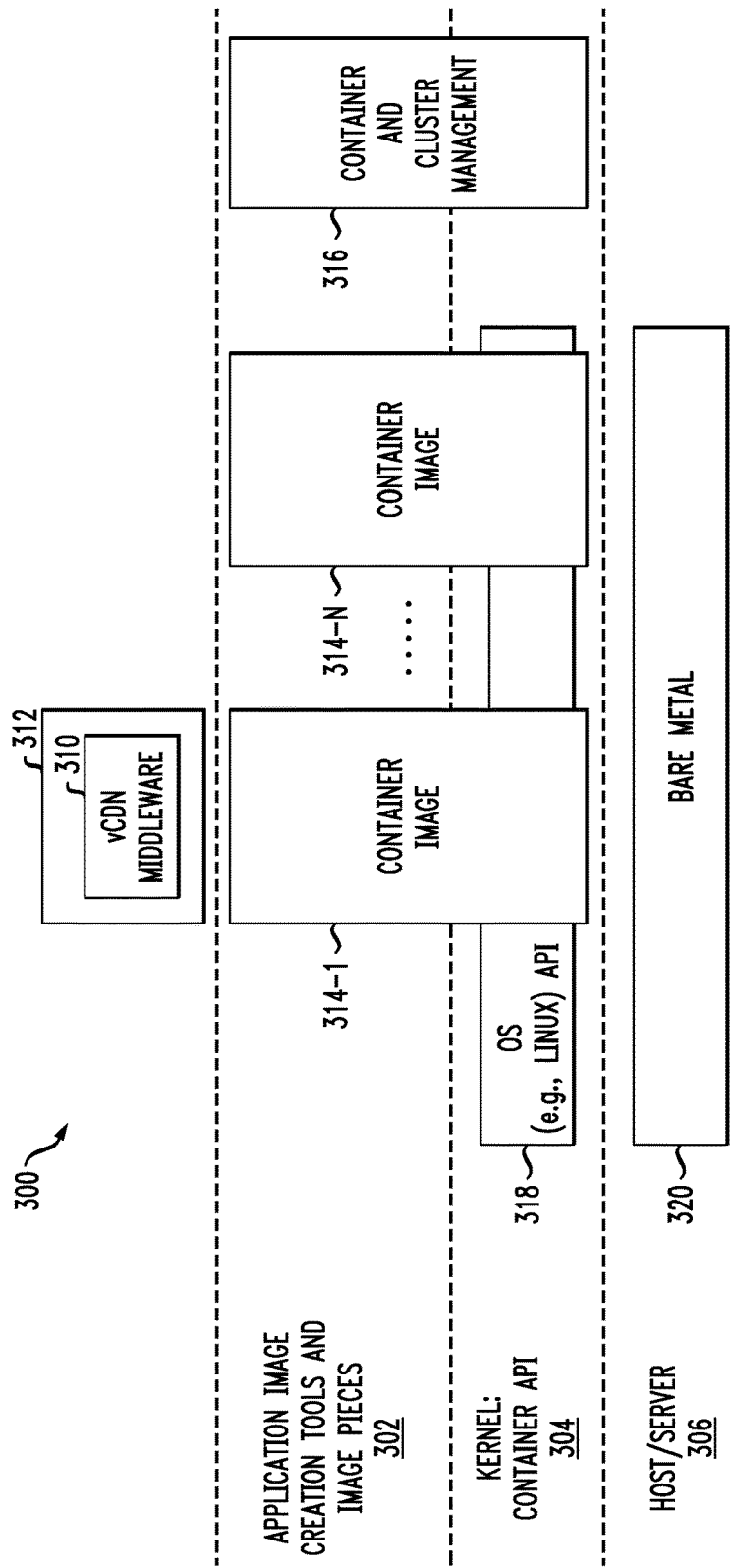
FIGS. 3, 4, 5 and 6 show portions of respective information processing systems each comprising one or more virtual content delivery networks in illustrative embodiments.

The FIG. 3 embodiment illustrates the use of containers in implementing one or more vCDN nodes. In this embodiment, information processing system 300 comprises an application image layer 302, a kernel layer 304, and a host/server layer 306. Above the application image layer 302 is vCDN middleware 310 associated with a VNF instance 312 illustratively implemented as an application running in a container.

The application image layer 302 more particularly comprises application image creation tools and image pieces, the latter including respective container images. The vCDN middleware 310 of the VNF instance 312 is associated with a container image 314-1 and utilized to implement at least one vCDN node of at least one vCDN. The application image layer 302 further comprises additional container images up to container image 314-N, each of which can similarly support a corresponding VNF instance running in a container and implementing at least one vCDN node of at least one vCDN. A container and cluster management component 316 is associated with the application image layer 302 and the kernel layer 304 as shown in FIG. 3.

The kernel layer 304 comprises a container application programming interface (API) 318 providing an operating system (OS) interface to the container images 314 of the application image layer 302. The OS may comprise Linux or any other suitable OS.

The host/server layer 306 comprises physical infrastructure in the form of "bare metal" components 320. These components may comprise, for example, servers, storage, network and converged infrastructure resources, and other physical infrastructure, similar to that of at least portions of hardware 206 of the FIG. 2 embodiment.

Embodiments including a vCDN control plane will now be described with reference to FIGS. 4, 5 and 6.

Figure 4:
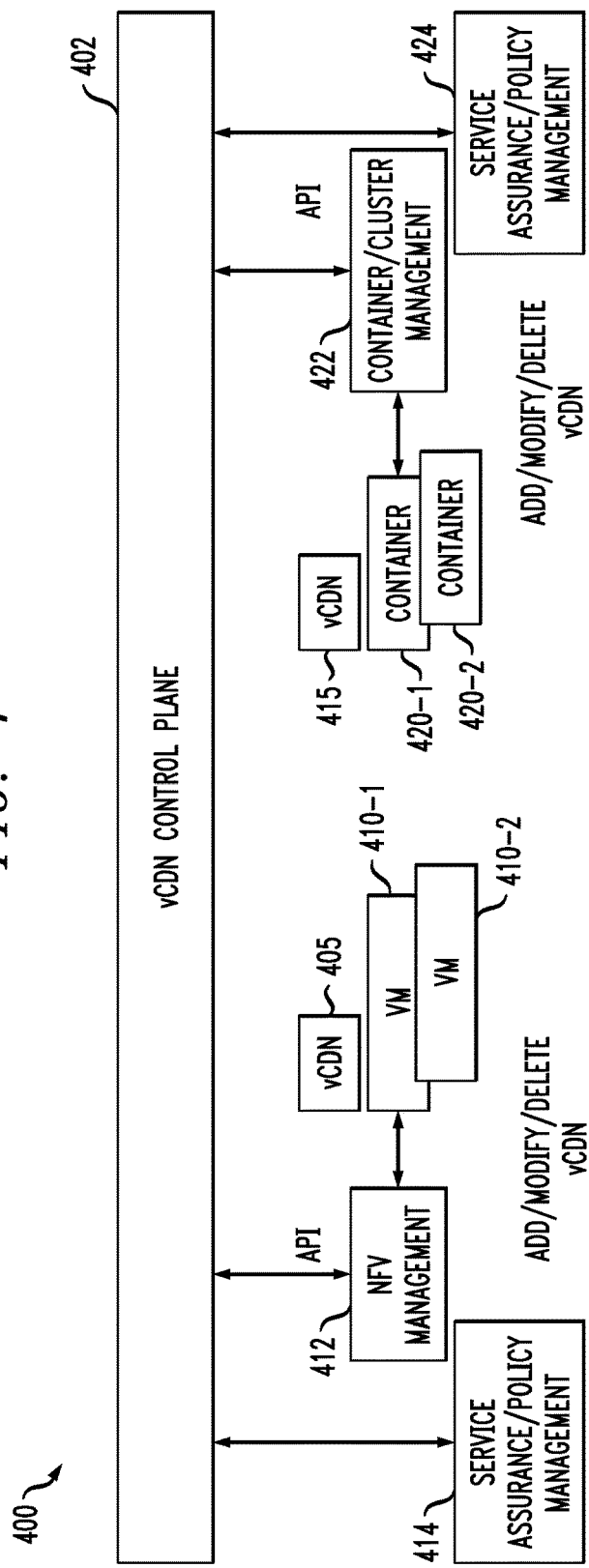

Referring first to FIG. 4, an information processing system 400 implementing one or more vCDNs each comprising one or more vCDN nodes associated with respective VNF instances of an NFV framework comprises a vCDN control plane 402. The vCDN control plane 402 in this embodiment is arranged as an overlay relative to the NFV framework which utilizes virtualization infrastructure of the system 400.

A first vCDN 405 in this embodiment comprises one or more vCDN nodes running on first and second virtual machines 410-1 and 410-2. The first vCDN 405 is controlled at least in part by an NFV management entity 412 operating in cooperation with a service assurance/policy management entity 414. Although entity 414 in this embodiment incorporates both service assurance and policy management functionality, in other embodiments separate service assurance and policy management entities may be used. The same applies for other components, modules or entities disclosed herein. Accordingly, the notation "/" should be understood to refer to "and/or" unless otherwise indicated.

A given vCDN node of the first vCDN 405 is implemented utilizing one or more of the virtual machines 410 of the virtualization infrastructure under the control of the NFV management entity 412 which supports add, modify and delete operations relating to the one or more virtual machines 410 utilized to implement the given vCDN node.

A second vCDN 415 in the FIG. 4 embodiment comprises vCDN nodes running in first and second containers 420-1 and 420-2. The second vCDN 415 is controlled at least in part by a container/cluster management entity 422 operating in cooperation with a service assurance/policy management entity 424. Again, as indicated above, a composite entity such as 422 can be separated into separate entities, in this case separate container management and cluster management entities.

A given vCDN node of the second vCDN 415 is implemented utilizing one or more of the containers 420 of the virtualization infrastructure under the control of the container/cluster management entity 422 which supports add, modify and delete operations relating to the one or more containers 420 utilized to implement the given vCDN node.

Although illustratively described above as comprising separate vCDNs, the vCDNs 405 and 415 in this embodiment could alternatively be viewed as comprising separate portions of the same vCDN. Accordingly, a given vCDN may be implemented using a combination of virtual machines 410 and containers 420.

The vCDN control plane 402 communicates with entities 412, 414, 422 and 424 via respective APIs. These APIs illustratively include, for example, RESTful APIs configured to utilize Java Script Object Notation (JSON) message payloads. Other types of representational state transfer APIs configured to utilize object notation message payloads may be used, as well as additional or alternative APIs of types known to those skilled in the art.

In this embodiment, it is assumed that the entities 412, 414, 422 and 424 collectively support operations for adding one or more vCDN nodes having particular sizes (e.g., small, medium, large) or other characteristics to at least one of vCDN 405 and vCDN 415, modifying one or more vCDN nodes of at least one of vCDN 405 and vCDN 415, and deleting one or more vCDN nodes from at least one of vCDN 405 and vCDN 415. Such operations are indicated in the figure as comprising "Add/Modify/Delete vCDN" functionality relating to virtual machines 410 and containers 420.

Numerous additional or alternative operations can be supported, such as refreshing one or more vCDN nodes of at least one vCDN, increasing or decreasing at least one of compute, storage and network resources of one or more vCDN nodes of at least one vCDN in order to scale up or scale down the vCDN nodes, defining placement of one or more vCDN nodes within at least one vCDN, and defining at least one service level agreement (SLA) for one or more vCDN nodes of at least one vCDN.

These and other operations supported by one or more of the entities 412, 414, 422 and 424 may be directed to vCDNs, to nodes of the vCDNs or to the associated virtual machines or containers, as well as combinations thereof.

Moreover, such operations can be initiated at least in part based on requests from the vCDN nodes directed to NFV management or container/cluster management entities, possibly also using RESTful APIs with JSON message payloads as described previously.

Accordingly, a variety of different information flows can be supported in the FIG. 4 embodiment. In one such flow, the vCDN nodes request resources via the NFV management entity 412 and the associated API to the control plane 402. In another possible flow, proactive monitoring of vCDN nodes is performed by the NFV management entity 412 operating in conjunction with the service assurance/policy management entity 414, and vCDN node resources are increased or decreased based at least in part on the monitoring. Numerous other information flows involving one or more vCDNs nodes of a given vCDN, their associated virtual machines or containers, and one or more management entities and their respective APIs to the control plane 402 are possible in the FIG. 4 embodiment.

Figure 5:
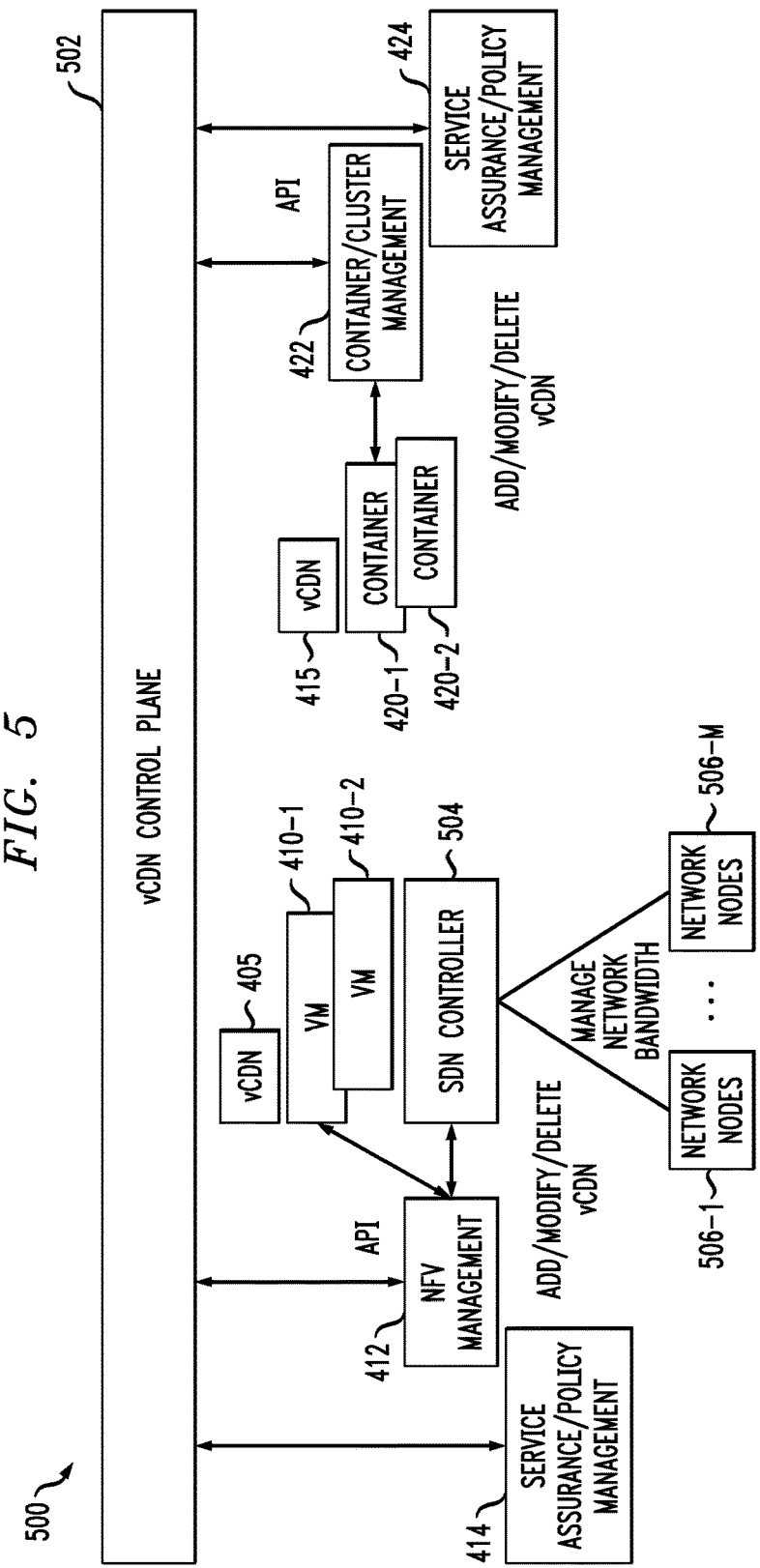

FIG. 5 shows another illustrative embodiment that includes a vCDN control plane. In this embodiment, information processing system 500 comprises a vCDN control plane 502 and is configured in a manner similar to that of the FIG. 4 embodiment. However, the vCDN control plane 502 is coupled to a software defined network (SDN) controller 504 via the NFV management entity 412. The SDN controller 504 is configured to interact with the NFV management entity 412 in order to adjust resources of one or more of vCDN nodes 506-1 through 506-M responsive to network bandwidth management operations. For example, the NFV management entity 412 operating in conjunction with the service assurance/policy management entity 414 can cause the SDN controller 504 to scale up or scale down the bandwidth between designated vCDN nodes in order to optimally migrate content between those nodes.

Figure 6:
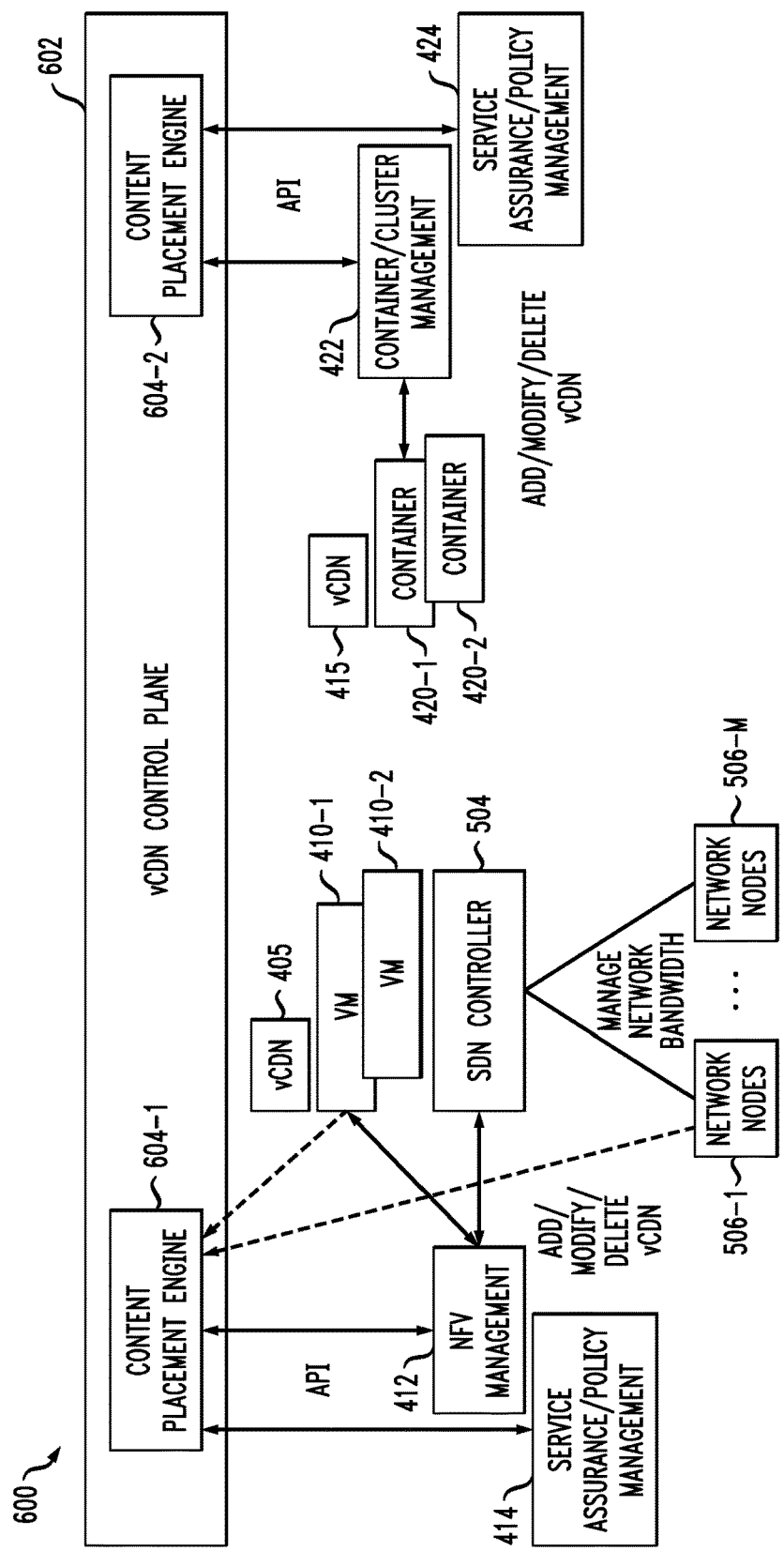

Yet another illustrative embodiment comprising a vCDN control plane is shown in FIG. 6. In this embodiment, information processing system 600 comprises a vCDN control plane 602 and is configured in a manner similar to that of the FIG. 5 embodiment. However, the vCDN control plane 602 further includes first and second content placement engines 604-1 and 604-2 as illustrated. The first content placement engine 604-1 is configured to interact with the entities 412 and 414 of the NFV framework in order determine an optimal placement of at least a subset of the vCDN nodes 506. The second content placement engine 604-2 is similarly configured to interact with the entities 422 and 424 in order to determine an optimal placement of at least a subset of the vCDN nodes implemented using containers 420.

For example, the content placement engines 604 in this embodiment can be configured to determine the optimal location for provisioning of new vCDN nodes based upon a set of attributes which may include current infrastructure capacity in terms of compute, storage and network resources, relative sizes of current workloads and requested workload, and relative costs of provisioning or migrating workloads.

The content placement engines 604 may be viewed as examples of what are more generally referred to herein as an "analytic entity." Another example of such an entity is the analytics module 220 of the FIG. 2 embodiment.

The particular vCDN embodiments illustrated in FIGS. 1 through 6 are exemplary only, and numerous other arrangements of vCDNs, vCDN nodes and associated VNF instances, as well as corresponding virtual machines, containers, management entities and other components, can be used in other embodiments. For example, in some embodiments, only subsets of these components, or additional or alternative sets of components, may be used, and such components may exhibit alternative functionality and configurations.

System components in a given embodiment illustratively communicate with one another over one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

One or more of the above-described illustrative embodiments can utilize the network partitioning techniques disclosed in U.S. patent application Ser. No. 14/042,180, entitled "A System and Method for Partitioning a Network," which is commonly assigned herewith and incorporated by reference herein.

At least portions of a given one of the systems of FIGS. 1 through 6 are implemented using one or more processing platforms, examples of which will be described in greater detail below in conjunction with FIGS. 8 and 9. A given such processing platform comprises at least one processing device comprising a processor coupled to a memory, and the processing device may be implemented at least in part utilizing one or more virtual machines, containers or other virtualization infrastructure.

A given information processing system as disclosed herein illustratively comprises one or more storage systems such as VNX® and Symmetrix VMAX®, both commercially available from EMC Corporation of Hopkinton, Mass. Other types of storage elements can be used in implementing an information processing system or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of an information processing system as disclosed herein.

The operation of another illustrative embodiment of an information processing system implementing a vCDN will now be described with reference to the flow diagram of FIG. 7. The process as shown includes steps 700 through 706, and is suitable for use in one or more of the systems of FIGS. 2 through 6 as previously described, as well as other types of information processing systems.

In step 700, virtualization infrastructure is provided in the information processing system. Examples of such virtualization infrastructure were previously described in conjunction with FIGS. 1 through 6.

In step 702, vCDN nodes are implemented utilizing the virtualization infrastructure. Each of the vCDN nodes comprises one or more VNF instances of an NFV framework of the virtualization infrastructure.

In step 704, characteristics relating to the vCDN nodes are monitored.

In step 706, one or more of the vCDN nodes for a given vCDN are added, modified or deleted, based at least in part on the monitored characteristics, in accordance with one or more specified policy criteria. The specified policy criteria can illustratively comprise criteria based at least in part on one or more of operational needs, engineering requirements or business criteria, as well as numerous others.

Figure 7:
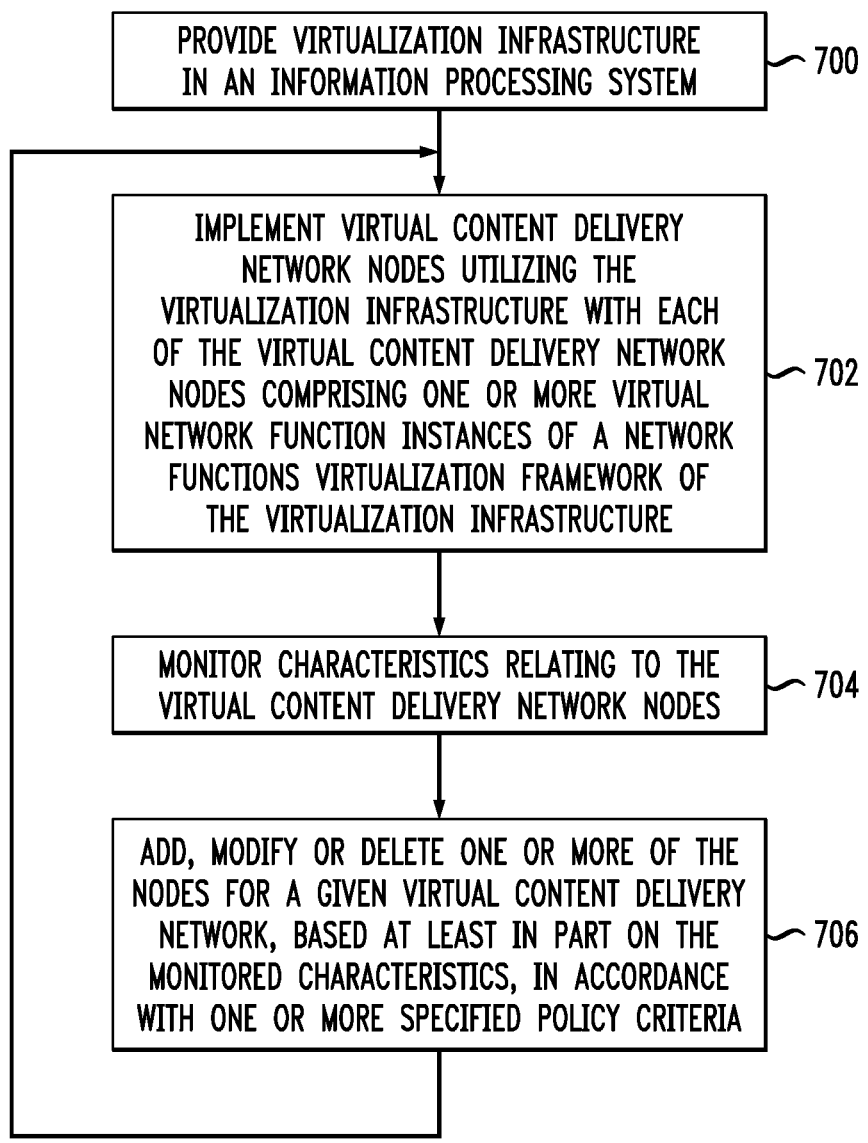
FIG. 7 is a flow diagram of an example process involving a virtual content delivery network implemented in an information processing system in an illustrative embodiment.

By way of example, in one possible implementation of the FIG. 7 process, an NFV management entity such as NFV management entity 412 of FIGS. 4 through 6 can be configured to proactively monitor one or more of the vCDN nodes and to adjust resources allocated to those nodes in order to satisfy one or more policies. This may include policies associated with ensuring a particular level of end user experience. In the presence of relatively high demand from end users, additional vCDN nodes can be deployed within a given vCDN. Similarly, at times of relatively low demand, one or more vCDN nodes can be taken down or otherwise removed from the given vCDN.

As another example, a given one of the vCDN nodes can be configured to request an increase or decrease in its allocated resources via the NFV management entity in order to implement a scaling up or a scaling down of the given vCDN node.

As a further example, the NFV management entity can be configured to adjust resources allocated to one or more of the vCDN nodes responsive to requests for content from one or more other ones of the vCDN nodes. It is also possible for vCDN nodes to be added or deleted based at least in part on such requests.

Hybrid approaches involving various combinations of different aspects of the above-described examples can be used, as will be appreciated by those skilled in the art.

The particular processing operations and other system functionality described in conjunction with the flow diagram of FIG. 7 are presented by way of illustrative example only, and should not be construed as limiting the scope of the invention in any way. Alternative embodiments can use other types of processing operations involving vCDN nodes of at least one vCDN. For example, the ordering of the process steps may be varied in other embodiments, or certain steps may be performed concurrently with one another rather than serially. Also, one or more of the process steps may be repeated periodically for different processing applications, or performed in parallel with one another.

It is to be appreciated that functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Advantageously, one or more of the illustrative embodiments avoid the need to plan particular sizes, locations and bandwidths for physical content delivery resources up front based on projected end user demand, and instead allow available virtual content delivery resources to be allocated dynamically among vCDNs and associated vCDN nodes based on actual end user demand. Capital expenditure associated with deployment of content delivery networks is thereby considerably reduced. Underutilization and overutilization of physical content delivery resources can be effectively eliminated, providing improved overall system performance and a better end user experience.

In addition, one or more of the illustrative embodiments can be made highly scalable through scale out and scale up mechanisms including hierarchically-distributed vCDN edge nodes, and potentially facilitate the creation of new business models for both telecommunication system and cable system service providers.

Furthermore, vCDNs as disclosed herein facilitate the implementation of real-time or near real-time analytics in a virtualized infrastructure environment. Appropriate actions can be taken to adjust the configuration of a given vCDN based on factors such as content type, time of day, service assurance metrics, etc.

It was noted above that at least portions of the information processing systems of FIG. 1 through 6 may be implemented using one or more processing platforms. Illustrative embodiments of such platforms will now be described in greater detail.

As shown in FIG. 8, portions of the information processing systems may comprise cloud infrastructure 800. The cloud infrastructure 800 comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

Although only a single hypervisor 804 is shown in the embodiment of FIG. 8, a given information processing system may of course include multiple hypervisors each providing a set of virtual machines using at least one underlying physical machine. Different sets of virtual machines provided by one or more hypervisors may be utilized in configuring multiple instances of a vCDN node or other component of the system.

An example of a commercially available hypervisor platform that may be used to implement hypervisor 804 and possibly other portions of the given information processing system in one or more embodiments of the invention is the VMware® vSphere® which may have an associated virtual infrastructure management system such as the VMware® vCenter™. The underlying physical machines may comprise one or more distributed processing platforms that include storage products, such as the above-noted VNX® and Symmetrix VMAX®. A variety of other storage products may be utilized to implement at least a portion of the given information processing system.

One or more of the processing modules or other components of an information processing system as disclosed herein may therefore each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of an information processing system and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and an information processing system may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in a given information processing system. Such components can communicate with other elements of the information processing system over any type of network or other communication media.

As indicated previously, components of a vCDN or its associated information processing system as disclosed herein can be implemented at least in part in the form of one or more software programs stored in memory and executed by a processor of a processing device such as one of the virtual machines 802 or one of the processing devices 902. For example, vCDN nodes in one or more of the embodiments described herein are illustratively implemented at least in part in the form of software.

It should again be emphasized that the above-described embodiments of the invention are presented for purposes of illustration only. Many variations and other alternative embodiments may be used. For example, the disclosed techniques are applicable to a wide variety of other types of information processing systems and processing devices. Also, the particular configurations of system and device elements shown in FIGS. 1-6, 8 and 9 can be varied in other embodiments. Thus, for example, the particular type of vCDNs, vCDN nodes and other related system entities and other components deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising:
   virtualization infrastructure; and
   a plurality of virtual content delivery network nodes implemented utilizing the virtualization infrastructure;
   wherein each of the virtual content delivery network nodes comprises one or more virtual network function instances of a network functions virtualization framework of the virtualization infrastructure;
   wherein the processing platform further comprises a virtual content delivery network control plane arranged as an overlay relative to the network functions virtualization framework of the virtualization infrastructure;
   wherein the virtual content delivery network control plane communicates with the network functions virtualization framework via one or more application programming interfaces;
   wherein a given one of the virtual content delivery network nodes is implemented utilizing one or more kernel-based operating system level virtualization containers of the virtualization infrastructure;
   wherein the one or more kernel-based operating system level virtualization containers comprise respective distinct processing entities relative to any hypervisor-based virtual machines of the virtualization infrastructure;
   wherein the one or more kernel-based operating system level virtualization containers are implemented using one or more respective container images of an application image layer of the virtualization infrastructure;
   wherein the virtualization infrastructure further comprises a kernel layer, the kernel layer comprising at least one container application programming interface providing an operating system interface to the one or more container images of the application image layer; and
   wherein the processing platform is implemented using a plurality of processing devices each comprising a processor coupled to a memory;
   at least one of the processing devices of the processing platform further comprising a software defined network controller configured to interact with a network functions virtualization management entity of the network functions virtualization framework in order to adjust resources of one or more of the virtual content delivery network nodes responsive to network bandwidth management operations;

the virtual content delivery network control plane being coupled to the software defined network controller via the network functions virtualization management entity;

the network functions virtualization management entity being configured to cause the software defined network controller to scale up or scale down amounts of bandwidth between designated ones of the virtual content delivery network nodes so as to facilitate migration of content between those nodes.

2. The apparatus of claim 1 wherein the virtual content delivery network nodes are dynamically added to, modified in and deleted from at least one virtual content delivery network in accordance with one or more specified policy criteria.

3. The apparatus of claim 1 wherein at least one of the virtual content delivery network nodes comprises at least one of an edge node and a core node of at least one virtual content delivery network.

4. The apparatus of claim 1 wherein the virtual content delivery network nodes are hierarchically distributed to facilitate scaling of at least one virtual content delivery network.

5. The apparatus of claim 1 wherein the one or more application programming interfaces comprise at least one representational state transfer application programming interface configured to utilize object notation message payloads.

6. The apparatus of claim 1 wherein the one or more application programming interfaces support operations for one or more of:
   adding a virtual content delivery network node having particular characteristics to a virtual content delivery network;
   modifying a virtual content delivery network node of a virtual content delivery network;
   deleting a virtual content delivery network node from a virtual content delivery network;
   refreshing a virtual content delivery network node of a virtual content delivery network;
   increasing or decreasing at least one of compute, storage and network resources of a virtual content delivery network node of a virtual content delivery network in order to scale up or scale down the virtual content delivery network node;
   defining placement of a virtual content delivery network node within a virtual content delivery network; and
   defining at least one service level agreement for a virtual content delivery network node of a virtual content delivery network.

7. The apparatus of claim 1 wherein the virtual content delivery network control plane coordinates communication between multiple entities associated with the virtualization infrastructure, and wherein said entities comprise at least a subset of:
   a network functions virtualization management entity;
   a service orchestration entity;
   an analytics entity;
   a service assurance entity;
   a policy management entity;
   a container management entity; and
   a cluster management entity.

8. The apparatus of claim 1 wherein at least one of the virtual content delivery network nodes is implemented utilizing one or more virtual machines of the virtualization infrastructure under the control of a network functions virtualization management entity of the network functions virtualization framework and wherein the network functions virtualization management entity supports add, modify and delete operations relating to the one or more virtual machines utilized to implement that virtual content delivery network node.

9. The apparatus of claim 1 wherein the given one of the virtual content delivery network nodes implemented utilizing one or more containers of the virtualization infrastructure is implemented under the control of at least one of a container management entity and a cluster management entity associated with the virtualization infrastructure and wherein said at least one of the container management entity and the cluster management entity supports add, modify and delete operations relating to the one or more containers utilized to implement the given virtual content delivery network node.

10. The apparatus of claim 1 wherein at least one of the virtual content delivery network nodes is configured to request an increase or decrease in its allocated resources via a network functions virtualization management entity of the network functions virtualization framework in order to implement a scaling up or a scaling down of the given virtual content delivery network node.

11. The apparatus of claim 1 wherein a network functions virtualization management entity of the network functions virtualization framework is configured to proactively monitor one or more of the virtual content delivery network nodes and to adjust resources allocated to those nodes in order to satisfy one or more policies.

12. The apparatus of claim 1 wherein a network functions virtualization management entity of the network functions virtualization framework is configured to adjust resources allocated to one or more of the virtual content delivery network nodes responsive to requests for content from one or more other ones of the virtual content delivery network nodes.

13. The apparatus of claim 1 further comprising a content placement engine configured to interact with a network functions virtualization entity of the network functions virtualization framework in order determine an optimal placement of at least a subset of the virtual content delivery network nodes.

14. An information processing system comprising the apparatus of claim 1.

15. A method comprising:
   providing virtualization infrastructure; and
   implementing a plurality of virtual content delivery network nodes utilizing the virtualization infrastructure;
   wherein each of the virtual content delivery network nodes comprises one or more virtual network function instances of a network functions virtualization framework of the virtualization infrastructure;
   wherein the virtual content delivery nodes are configured at least in part utilizing a virtual content delivery network control plane arranged as an overlay relative to the network functions virtualization framework of the virtualization infrastructure;
   wherein the virtual content delivery network control plane communicates with the network functions virtualization framework via one or more application programming interfaces;
   wherein a given one of the virtual content delivery network nodes is implemented utilizing one or more kernel-based operating system level virtualization containers of the virtualization infrastructure;
   wherein the one or more kernel-based operating system level virtualization containers comprise respective distinct processing entities relative to any hypervisor-based virtual machines of the virtualization infrastructure;

wherein the one or more kernel-based operating system level virtualization containers are implemented using one or more respective container images of an application image layer of the virtualization infrastructure;

wherein the virtualization infrastructure further comprises a kernel layer, the kernel layer comprising at least one container application programming interface providing an operating system interface to the one or more container images of the application image layer; and wherein the providing and implementing are performed using at least one processing device comprising a processor coupled to a memory;

said at least one processing device being further configured to implement a software defined network controller configured to interact with a network functions virtualization management entity of the network functions virtualization framework in order to adjust resources of one or more of the virtual content delivery network nodes responsive to network bandwidth management operations;

the virtual content delivery network control plane being coupled to the software defined network controller via the network functions virtualization management entity;

the network functions virtualization management entity being configured to cause the software defined network controller to scale up or scale down amounts of bandwidth between designated ones of the virtual content delivery network nodes so as to facilitate migration of content between those nodes.

16. The method of claim 15 wherein implementing a plurality of virtual content delivery network nodes comprises adding, modifying and deleting one or more of the nodes for a given virtual content delivery network in accordance with one or more specified policy criteria.

17. The method of claim 15 wherein a network functions virtualization management entity of the network functions virtualization framework is configured to adjust resources allocated to one or more of the virtual content delivery network nodes responsive to requests for content from one or more other ones of the virtual content delivery network nodes.

18. An article of manufacture comprising a non-transitory processor-readable storage medium having stored therein program code of one or more software programs, wherein the program code when executed by at least one processing device causes said processing device:

to provide virtualization infrastructure; and to implement a plurality of virtual content delivery network nodes utilizing the virtualization infrastructure;

wherein each of the virtual content delivery network nodes comprises one or more virtual network function instances of a network functions virtualization framework of the virtualization infrastructure;

wherein the virtual content delivery nodes are configured at least in part utilizing a virtual content delivery network control plane arranged as an overlay relative to the network functions virtualization framework of the virtualization infrastructure;

wherein the virtual content delivery network control plane communicates with the network functions virtualization framework via one or more application programming interfaces;

wherein a given one of the virtual content delivery network nodes is implemented utilizing one or more kernel-based operating system level virtualization containers of the virtualization infrastructure;

wherein the one or more kernel-based operating system level virtualization containers comprise respective distinct processing entities relative to any hypervisor-based virtual machines of the virtualization infrastructure;

wherein the one or more kernel-based operating system level virtualization containers are implemented using one or more respective container images of an application image layer of the virtualization infrastructure; and wherein the virtualization infrastructure further comprises a kernel layer, the kernel layer comprising at least one container application programming interface providing an operating system interface to the one or more container images of the application image layer;

said program code when executed by said processing device further causing said processing device to implement a software defined network controller configured to interact with a network functions virtualization management entity of the network functions virtualization framework in order to adjust resources of one or more of the virtual content delivery network nodes responsive to network bandwidth management operations;

the virtual content delivery network control plane being coupled to the software defined network controller via the network functions virtualization management entity;

the network functions virtualization management entity being configured to cause the software defined network controller to scale up or scale down amounts of bandwidth between designated ones of the virtual content delivery network nodes so as to facilitate migration of content between those nodes.

19. The article of manufacture of claim 18 wherein a network functions virtualization management entity of the network functions virtualization framework is configured to adjust resources allocated to one or more of the virtual content delivery network nodes responsive to requests for content from one or more other ones of the virtual content delivery network nodes.

* * * * *